United States Patent
Van Den Enden

(10) Patent No.: US 7,127,152 B2
(45) Date of Patent: Oct. 24, 2006

(54) METHOD OF AND ARRANGEMENT FOR RECORDING AND REPRODUCING VIDEO IMAGES

(75) Inventor: Gijsbert J. Van Den Enden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1165 days.

(21) Appl. No.: 10/084,754

(22) Filed: Feb. 25, 2002

(65) Prior Publication Data

US 2002/0081095 A1 Jun. 27, 2002

Related U.S. Application Data

(63) Continuation of application No. 09/062,934, filed on Apr. 20, 1998.

(30) Foreign Application Priority Data

Apr. 24, 1997 (EP) .................................. 97201220

(51) Int. Cl.
*H04N 5/91* (2006.01)
*H04N 7/26* (2006.01)

(52) U.S. Cl. ........................................ 386/68; 386/111
(58) Field of Classification Search ................. 386/68, 386/109, 111, 112, 27, 33, 46, 1, 6, 67
See application file for complete search history.

(56) References Cited

U.S. PATENT DOCUMENTS

| | | | | |
|---|---|---|---|---|
| 5,040,061 | A | * | 8/1991 | Yonemitsu ............. 375/240.13 |
| 5,282,049 | A | | 1/1994 | Hatakenaka et al. ......... 358/335 |
| 5,305,113 | A | | 4/1994 | Iwamura et al. ............ 358/312 |
| 5,377,051 | A | | 12/1994 | Lane et al. ................ 360/33.1 |
| 5,535,008 | A | | 7/1996 | Yamagishi et al. ......... 358/342 |
| 5,887,110 | A | * | 3/1999 | Sakamoto et al. ............ 386/68 |

* cited by examiner

*Primary Examiner*—Robert Chevalier

(57) ABSTRACT

A method for reproducing video frames coded in accordance with an MPEG format, in which a carrier provided with recordings is played with a speed which differs from the nominal playback speed, and in which the number of frames to be transferred to a display apparatus and generated by reading out is compensated in such a manner that the average number per unit of time is equal to a predetermined nominal number by repeating or by skipping B frames.

5 Claims, 3 Drawing Sheets

| 1 | 2 | 3 | 4 | 5 | 6 | 7 | 8 | 9 |
|---|---|---|---|---|---|---|---|---|
| I | B | B | P | B | B | P | B | B |

FIG. 2A

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| I(1) | B(2) | B(2) | B(3) | B(3) | P(4) | B(5) | B(5) | B(6) | B(6) | P(7) | B(8) | B(8) | B(9) | B(9) |

FIG. 2B

| 1 | 2 | 3 | 4 | 5 | 6 |
|---|---|---|---|---|---|
| I(1) | B(2) | P(4) | B(5) | P(7) | B(8) |

FIG. 2C

METHOD OF AND ARRANGEMENT FOR RECORDING AND REPRODUCING VIDEO IMAGES

CROSS-REFERENCE TO RELATED APPLICATIONS

This is a continuation of U.S. patent application Ser. No. 09/062,934, filed Apr. 20, 1998.

BACKGROUND OF THE INVENTION

1. Field of the Invention

The invention relates to the recording and reproduction of image information (video). More in particular, the present invention relates to the general problem of reproducing the recorded image information at a speed other than the normal speed.

As is known, video images (frames) are reproduced in accordance with a predetermined format on a standard image display apparatus, such as a television set, the pixels of the frame being reproduced not simultaneously but sequentially. More particularly, adjacent pixels are written consecutively so as to write a horizontal line and the horizontal lines of the frame are written consecutively (interlaced). The time thus required for reproducing one frame, i.e., the time required to write all the image lines making up the frame, is $\frac{1}{25}$ second in the PAL format. Consequently, a scene whose actual playing time is 100 seconds corresponds to a sequence of 2500 consecutive frames.

2. Description of the Related Art

For recording video images on a carrier, such as, for example, a magnetic tape, an analog method is known in which the consecutive pixels are recorded adjacent one another on recording tracks which are inclined with respect to the playing direction of the carrier. Each recording track then corresponds to one image line. With recordings of this type the possibilities for slow-motion or fast-motion reproduction are limited. For example, when it is desired to reproduce a scene at five times the normal speed, the carrier is moved past a read head at five times the normal speed. This means that five consecutive images move past the read head in the time required for the reproduction of a single image by the image display apparatus. An image reproduced on the display screen then takes the form of five fragments of these five consecutive images, which fragments are displayed one above the other and are separated from one another by distorted image portions.

More recently, a digital recording method, termed MPEG, has been developed. In this method, the information relating to an image is digitally coded and compressed, and is linearly stored on a carrier, which is to be understood to mean that the consecutive bits are arranged in line with one another in the write and read direction of the carrier.

When such a recording is played back, the bits being read do not correspond to the pixels of a frame to be reproduced consecutively. A multiplicity of bits must be collected in order to be decoded and in order to reconstruct the image content of one or more consecutive frames. The buffer memories and computing devices required for this may be provided in the playback apparatus or in the display apparatus. It is to be noted, though, that, on an average, the number of bits read corresponds to 25 frames per second at a normal playback speed of the carrier. In principle, it is possible to move the carrier more rapidly or slowly past the read head. However, the problem is that a standard display apparatus, such as a television set, is not capable of converting the signals then received to normal frames.

SUMMARY OF THE INVENTION

It is an object of the present invention to provide a method and an arrangement which enable a video recording made in accordance with an MPEG method, to be reproduced with a playback speed which is adjustable within ample margins on a standard display apparatus such as a television set.

More particularly, it is an object of the present invention to allow the user of such a playback arrangement to vary the playback speed almost continuously between slow-motion and fast-motion reproduction.

BRIEF DESCRIPTION OF THE DRAWINGS

These and other aspects, features and advantages of the present invention will be elucidated by means of the following description of a preferred embodiment of a method and arrangement in accordance with the invention with reference to the drawings, in which:

FIG. 2A shows an example of an MPEG sequence;

FIG. 2B shows an example of a sequence for slow-motion reproduction derived from the sequence in FIG. 2A;

FIG. 2C shows an example of a sequence for fast-motion reproduction derived from the sequence in FIG. 2A.

DESCRIPTION OF THE PREFERRED EMBODIMENTS

Since MPEG coding is known per se, only a brief description of some essential aspects of an MPEG recording procedure will be given with reference to FIG. 1. Specifically, a brief description of three different types of MPEG coding for a frame will be given, these types of coding being referred to as I coding, P coding, and B coding, and requiring a decreasing number of bits per frame in the listed order.

Figure 1A:
FIGS. 1A–1E illustrate the amount of information saved by MPEG coding.

FIG. 1A illustrates a sequence of consecutive frames to be recorded on a carrier such as a magnetic tape, the individual frames bearing sequence numbers N, N+1, N+2, etc. In the PAL format, each frame corresponds to a playing time of $\frac{1}{25}$ second.

Figure 1B:
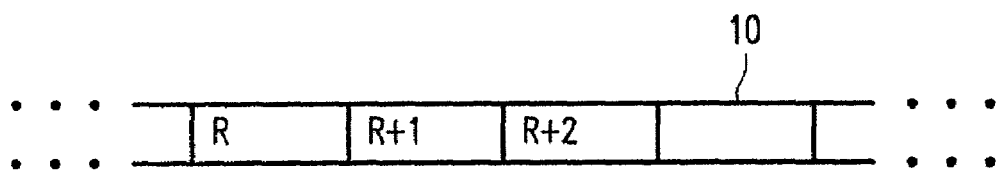

FIG. 1B shows, diagrammatically, a magnetic tape 10 on which consecutive recording areas R, R+1, R+2, etc., have been indicated, these areas having equal lengths, i.e., each of these recording areas R, R+1, R+2, etc., contains the same number of bits. If each frame N, N+1, N+2, etc., had been recorded individually in digitally coded form, the recording of the sequence illustrated in FIG. 1A would take the form outlined in FIG. 1B.

Figure 1C:
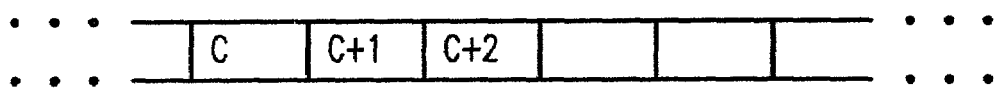

In order to reduce the amount of information expressed in bits/second during the read-out of the digital information and during the transmission of the information thus read to a reproduction apparatus, the image information is compressed prior to recording. In FIG. 1C, this is illustrated, diagrammatically, in that the carrier 10 has consecutive recording areas C, C+1, C+2, etc., each having a length smaller than that of the corresponding recording areas R, R+1, R+2, etc., in FIG. 1B. FIG. 1C particularly relates to a situation arising when the information of each individual frame N, N+1, N+2, etc., would be compressed to a compressed frame prior to recording. In such a case the associated original frame N, N+1, N+2, etc., can be derived from each compressed frame C, C+1, C+2, etc., by decompression and decoding. Coded and compressed frames having this feature will be referred to as intrinsic frames or I frames.

Figure 1D:
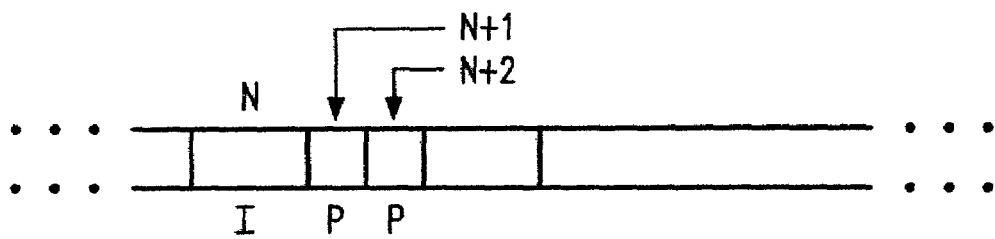
Figure 1E:
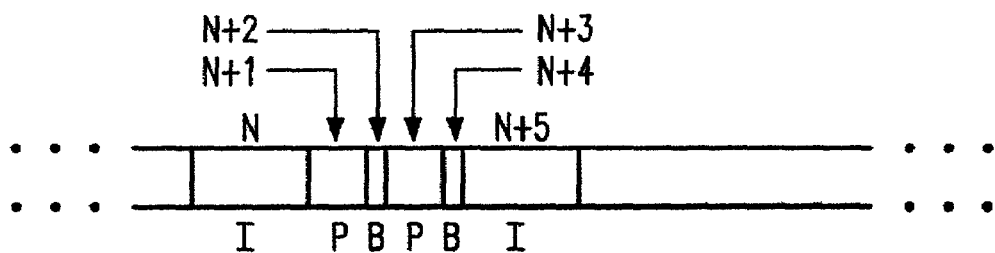

A further reduction of the amount of information is possible as a result of the fact that normally the consecutive frames of a sequence bear much resemblance to one another. If, for a frame, only the differences from its predecessor are recorded, less information is required to record this frame. Such a frame will be referred to as a predicted frame or P frame and contains motional information of frame portions. FIG. 1D diagrammatically illustrates a situation in which the frame N is recorded as an I frame and in which the next two frames N+1 and N+2 are recorded as P frames. It will be evident that it is not possible to reconstruct, for example, the frame N+1 by decompression and decoding of the recorded information of merely the P frame corresponding to the frame N+1 but that for this it is necessary to combine the recorded information of the P frame corresponding to the frame N+1 with the I frame corresponding to the frame N. However, it will also be evident that a comparatively small number of bits are required to record the two consecutive frames N and N+1.

MPEG further includes a coded and compressed frame of a third type, which will be referred to as a bi-directional frame or B frame. To record a B frame, even less bits are required than for recording a P frame, as is illustrated, diagrammatically, in FIG. 1E. The original frame corresponding to a B frame is reconstructed from the information of three coded and compressed frames, i.e., said B frame, the last I frame or P frame preceding it, and the first I frame or P frame following said B frame.

It is to be noted that the amount of information to be recorded depends on the image content of the consecutive frames. For example, the reproduction of a one-hour image sequence would require approximately 540 Gbit (67.5 Gbyte) but this amount of information can be compressed to approximately 10.8 Gbit (1.35 Gbyte) by means of MPEG recording.

The playback of video recordings thus coded will now be described with reference to FIGS. 2A–2C.

FIG. 2A shows, diagrammatically, an example of a sequence of stored video frames. The frames successively bear the numerals 1, 2, 3, . . . , as indicated in the upper part of FIG. 2A, and the type of each respective frame is specified in the lower part of FIG. 2A. For the sake of simplicity, the I, P and B frames are shown as though they are equal in size. The coding structure IBBPBBPBB may be recurrent; in that case, a group of nine consecutive frames is termed "Group Of Pictures" or GOP. It is to be noted that in MPEG, the length of a GOP (i.e., 9 frames in the present case) is variable. Moreover, the structure of a GOP, particularly, the number of succeeding B-frames, is variable and dependent on the image content of the frames to be recorded. It is to be noted also that whether a frame is to be recorded as an I frame, a P frame or a B frame is decided during the recording of a sequence by a recording apparatus (video recorder); however, the manner in which this decision is made is not relevant to the present invention. In the scope of the present invention, it may be assumed that a recorded sequence includes I frames, P frames and B frames of a more or less regular coding structure.

If this recorded sequence is to be reproduced by means of a display apparatus, such as a television set, in a normal way (i.e., in real time), the coded frames are consecutively read by a playback apparatus (video recorder) and are supplied to said display apparatus in coded form. Each coded frame also includes information relating to the coding type. As stated hereinbefore, the recording of an I frame involves more information than a P frame and a B frame, as a result of which, the read-out and the transmission of a P-frame to the display apparatus takes a shorter time than the read-out and transmission of an I frame; the read-out and transmission of a B frame takes an even shorter time. However, on an average, the number of PAL-format frames (I, P and B together) read and transmitted is 25 frames per second.

In the display apparatus, the frames received are decompressed and decoded, after which the decoded frames are stored in a buffer memory. The stored frames are read from this buffer memory and displayed, the reproduction of each frame in PAL format taking ½5 second regardless of whether it has been coded as an I frame, P frame or B frame.

If it is desired to view the recorded sequence at a speed other than the normal speed (fast-motion reproduction or slow-motion reproduction), it is not adequate to merely move the carrier past the read head at a higher or a lower speed. Indeed, in that case, the number of frames being stored in said buffer memory would be larger or smaller than the nominal number while, in the standard display apparatus, the frames are read from this buffer memory at the nominal rate (25 frames per second in the PAL format). The present invention provides a method which assures that the average number of coded frames presented to the display apparatus per unit of time remains equal to the nominal number, even when the carrier is moved past the read head at a higher or lower speed (fast-motion reproduction or slow-motion reproduction), as will be described hereinafter.

Figure 3:
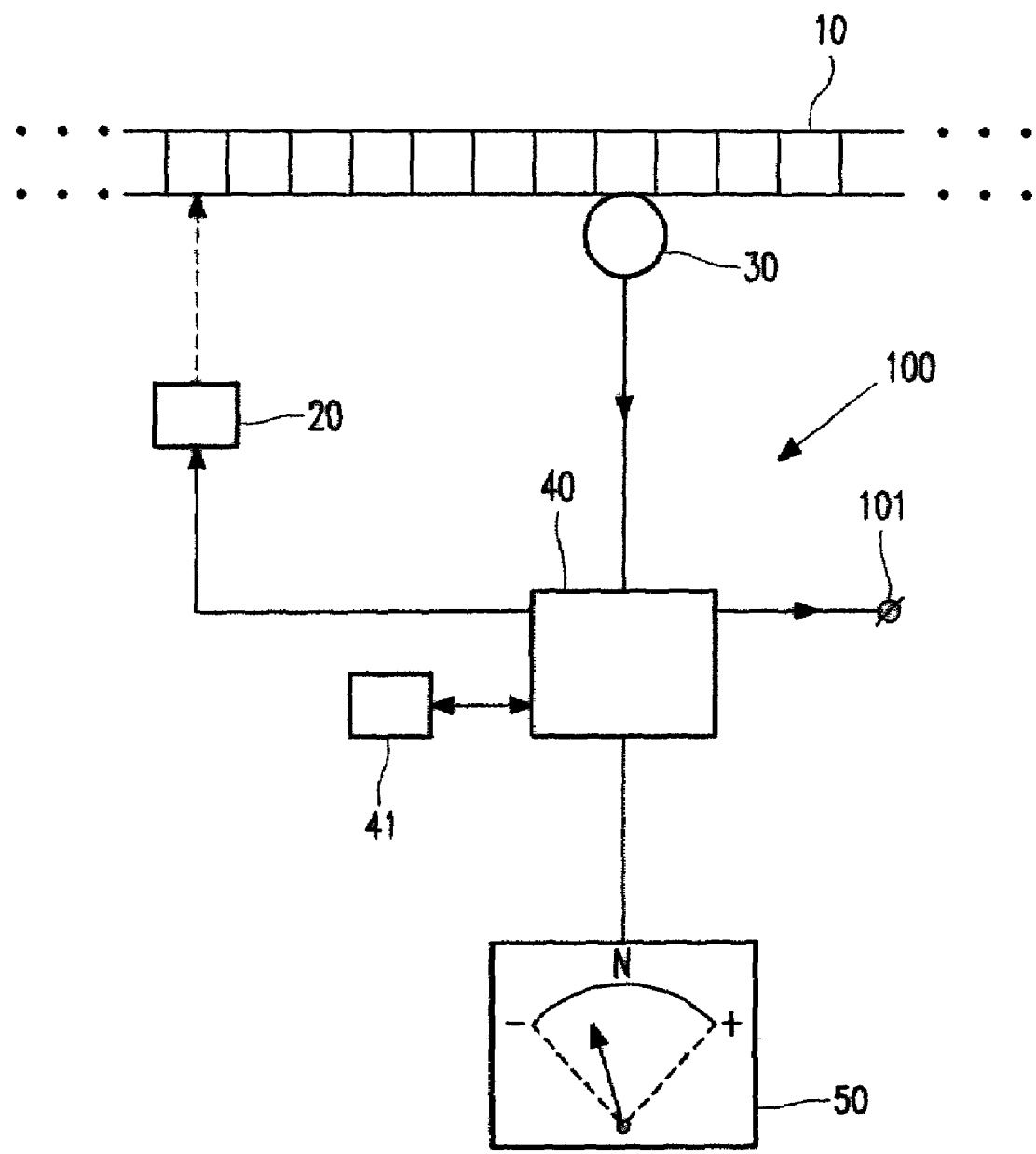
FIG. 3 is a block-schematic diagram of an arrangement in accordance with the invention.

FIG. 3 illustrates, diagrammatically, a playback apparatus 100 in accordance with the present invention, adapted to read information recorded on the carrier 10. The playback apparatus 100 has a read head 30 and means 20 for moving the carrier 10 past the read head 30. In the case that the carrier 10 is a magnetic tape, the movement means 20 comprises a motor for driving a take-up reel for the tape. In the case that the carrier 10 is a magnetic or optical disc, the movement means 20 comprises a motor for rotating the disc.

The playback apparatus 10 comprises a control device 40, which may comprise, for example, a suitably programmed (hardware-oriented or software oriented) microprocessor. The control device 40 is coupled to the movement means 20 to control the speed at which the movement means 20 moves the carrier 20 past the read head 30.

Furthermore, the control device 40 is coupled to the read head 30 to receive information read by the read head 30, this information, as stated, being coded information about video frames. The control device 40 is further coupled to an output 101 of the playback apparatus 100 for selectively applying information read by the read head 30 to the output 101, as will be described in more detail hereinafter.

The playback apparatus 100 has a playback speed selector switch 50 coupled to the control device 40, this switch being actuatable by a user. The selector switch 50 can have different configurations. In one configuration, the selector switch 50 can be constructed as a pointer which is movable along a scale graduation, this pointer, for example, actuating a wiper which is movable along a resistance track. In another configuration, the selector switch 50 can be an alphanumeric keyboard. It is also possible to combine these configurations, as will be evident to those skilled in the art.

By means of the selector switch 50, the user can give a command to the control device 40 in order to select the desired playback speed. Normally, the user will select a normal playback speed, marked "N" in FIG. 3. The control device 40 is adapted to control the movement means 20 in such a manner that the carrier 10 is moved with a substantially constant predetermine speed, hereinafter referred to as the nominal speed. The video signals received from the read head 30 are then transferred integrally to the output 101.

The control device 40 is also adapted to monitor the stream of data received from the read head 30 and to measure the average number of frames per unit of time in this data stream. The control device 40 compares the measured average with a predetermined fixed value, hereinafter referred to as the nominal value, this nominal value being 25 frames per second in the case of the PAL format. If the measured average is greater than this nominal value, the control device 40 controls the movement means 20 to move the carrier more slowly past the read head 30, and if the measured average is smaller than this nominal value, the control device 40 controls the movement means 20 to move the carrier more rapidly past the read head 30, so as to assure that the number of frames supplied to the output 101 per unit of time is equal to said nominal value.

If the user wishes to select a playback speed other than the nominal speed, the user actuates the selector switch 50 to enter a speed factor $\alpha$. Hereinafter, the speed factor $\alpha$ will be defined as a factor by which the nominal playback speed should be multiplied, so that a speed factor $\alpha$ greater than one corresponds to fast-motion reproduction and a speed factor $\alpha$ between zero and one corresponds to slow-motion reproduction.

In accordance with an important aspect of the present invention the speed factor $\alpha$ can be adjusted continuously within given limits. In a variant, it may be possible that the user can choose only from a (comparatively large) number of predetermined values for the speed factor $\alpha$.

Hereinafter, an example of slow-motion reproduction in accordance with the present invention will be elucidated with reference to FIG. 2B, in order to illustrate the principle of the present invention. FIG. 2B shows a sequence of frames derived from the sequence shown in FIG. 2A by means of the control device 40 by repeating each B frame one time. Again, the frames in the new sequence successively bear the numerals 1, 2, 3, . . . , as indicated in the upper part of FIG. 2B and the type of each respective frame is specified in the lower part of FIG. 2B, the original sequence number of this frame (FIG. 2A) being given in parentheses.

Thus, in the present example, a new sequence of 15 frames is derived from an original sequence comprising 9 frames. An essential feature is that the new sequence fully complies with the MPEG format, as a result of which, the control device 40 can supply this modified sequence directly to a standard display apparatus, which can then directly decode and display this modified sequence. The playing time of this modified sequence (15 frames) is longer than that of the original sequence (9 frames) so that slow-motion play is obtained: the speed factor $\alpha$ in the present case being consequently equal to 9/15 or 0.6.

It will be evident that there are a large number of "clean" speed factors $\alpha$ smaller than one. In the sequence of a GOP shown, by way of example, in FIG. 2A, it is also simply possible to attain factors of 9/10, 9/11, 9/12, 9/13 and 9/14, namely, by repeating 1, 2, 3, 4, or 5 of the B frames in the GOP. Other fractions can be realized by considering more consecutive GOPs: if two consecutive GOPs are considered it is possible, for example, to obtain a speed factor of 18/23 by repeating 2 and 3 B frames in the first and the second GOP, respectively.

It is to be noted that very small slow-motion factors are attainable by repeating the B frames more than once. For example, if the B frames of the GOP of FIG. 2A are each transmitted four times in succession: in this case, the resulting slow-motion factor is 9/27=0.33. However, in the case of still smaller slow-motion factors, it is not unlikely that the reproduced image makes a jerky impression upon a viewer.

In practice, the length of the GOPs is not necessarily constant, as a result of which, it is not certain whether a given desired speed factor can be realized in any GOP. However, this is not important, an important feature of the present invention being that in the case of a delayed read-out of frames, it is possible to obtain, on an average, the nominal number of frames at the output 101 by repeating B frames.

Now reference is made to FIG. 3. The control device 40 is adapted to drive the movement means in the slow-motion reproduction mode with a speed which is substantially equal to $\alpha$ times the nominal speed. Consequently, the average number of frames read per unit of time by means of the read head 30 is substantially equal to $\alpha$ times the nominal number. As already stated, the control device 40 is adapted to monitor the data stream from the read head 30 and to count the number of frames transmitted per unit of time. Each time that the counted number is found to be smaller than the nominal number, the control device 40 will furnish the B-frame data X times at the output 101. For this purpose, the control device 40 comprises a memory 41 for storing the B-frame data.

In principle, X is chosen to be 2. However, if the selected speed factor is so small that supplying the B-frame data 2 times is not adequate to maintain the nominal frame rate, the control device 40 will increment X to 3 or even to 4.

This ensures again that the average number of frames supplied to the output 101 per unit of time is substantially equal to said nominal value. It is to be noted that no modifications are required to receive the modified sequence at the side of the display apparatus because the average number of frames in the modified sequence is always equal to the nominal number of frames, and the modified sequence complies with the MPEG format. The display apparatus can decode each received frame in a "normal" manner and reproduce it on the screen in the nominal time (1/25 second in the PAL format) regardless of the source, i.e., regardless of whether it is a "normal" or a "repeated" frame.

Furthermore, it is to be noted that, in principle, it is possible to obtain any desired slow-motion factor, obviously within reasonable limits, because it is not necessary to repeat the same number of B frames in each GOP. It is merely important that for any reading speed (playing speed of the medium), a B frame is repeated at given instants, in such a manner that the total number of transmitted frames, averaged over a longer time, is always substantially to the nominal number. The actual length of the GOPs is then irrelevant.

Hereinafter, an example of fast-motion reproduction in accordance with the present invention will be elucidated with reference to FIG. 2C, in order to illustrate the principle of the present invention. FIG. 2C shows a sequence of frames derived from the sequence shown in FIG. 2A by means of the control device 40 by skipping every second B frame. Again, the frames in the new sequence successively bear the numerals 1, 2, 3, . . . , as indicated in the upper part of FIG. 2C and the type of each respective frame is specified in the lower part of FIG. 2C, the original sequence number of this frame (FIG. 2A) being given in parentheses.

Thus, in the present example, a new sequence of 6 frames is derived from an original sequence comprising 9 frames. An essential feature is that the new sequence fully complies with the MPEG format, as a result of which, the control device 40 can supply this modified sequence directly to a standard display apparatus, which can then directly decode and display this modified sequence. The playing time of this modified sequence (6 frames) is shorter than that of the original sequence (9 frames) so that fast-motion play is obtained: the speed factor α in the present case being consequently equal to 9/6 or 1.5.

It will be evident that there are a large number of "clean" speed factors α greater than one. In the sequence of a GOP shown, by way of example, in FIG. 2A, it is also simply possible to attain factors of 9/8, 9/7, 9/5, 9/4 and 9/3, namely, by skipping 1, 2, 3, 4, 5 or 6 of the B frames in the GOP. Other fractions can be realized by considering more consecutive GOPs: if two consecutive GOPs are considered it is possible, for example, to obtain a speed factor of 18/13 by skipping 2 and 3 B frames in the first and the second GOP, respectively.

It is evident that maximum fast-motion factor thus attainable depends on the number of frames in GOP. Larger fast-motion factors are possible by also skipping P frames, but this is only allowed if all the B frames associated with this P frame are skipped likewise. If all the B frames and P frames are skipped, only one frame (I) of a GOP will be displayed in the present example: the resulting fast-motion factor is then 9/1.

Now reference is made to FIG. 3. The control device 40 is adapted to drive the movement means in the fast-motion reproduction mode with a speed which is substantially equal to α times the nominal speed. Consequently, the average number of frames read per unit of time by the read head 30 is substantially equal to α times the nominal number. As already stated, the control device 40 is adapted to monitor the data stream from the read head 30 and to count the number of frames transmitted per unit of time. Each time that the counted number is found to be greater than the nominal number the control device 40 will block the data of a B frame (and, if desired, even of a P frame), as a result of which this data cannot reach the output 101.

This ensures, again, that the average number of frames supplied to the output 101 per unit of time is substantially equal to said nominal value. It is to be noted that no modifications are required to receive the modified sequence at the display apparatus because the average number of frames in the modified sequence is always equal to the nominal number of frames and, in addition, the modified sequence complies with the MPEG format. The display apparatus can decode each received frame in a "normal" manner and reproduce it on the screen in the nominal time (1/25 second in the PAL format).

Furthermore, it is to be noted that, in principle, it is possible to obtain any desired fast-motion factor, obviously within reasonable limits, because it is not necessary to skip the same number of B frames in each GOP. It is merely important that for any reading speed (playing speed of the medium), a B frame is skipped at given instants, in such a manner that the total number of transmitted frames, averaged over a longer time, is always substantially to the nominal number. The actual length of the GOPs is then irrelevant.

An important advantage of the method proposed in accordance with the present invention is that the reproduced images exhibit no disturbances and that the moving elements of an image actually exhibit faster motions. As already stated, the maximum fast-motion factor attainable by the method in accordance with the invention depends on the number of B frames (and P frames, if applicable) in a GOP. Obviously, even larger fast-motion factors are possible by also skipping I frames. However, at such high playback speeds (fast-motion factors of 9 and higher), an image which moves correspondingly faster can no longer be followed by a viewer, so that this possibility provided by the invention has hardly any practical advantage.

The present invention proposes an alternative which results in a steadier image for a viewer. In accordance with this alternative, a first predetermined number of consecutive frames is first transmitted to the display apparatus, after which a second predetermined number of consecutive frames is skipped. Said first and said second number preferably correspond to an integral number of GOPs. In an example in which one GOP is transmitted and subsequently nine consecutive GOPs are skipped, the resulting fast-motion factor is 10/1.

An advantage of this fast-motion reproducing method proposed by the present invention, is that the viewer always perceives a normally moving image scene for a short time, successive image scenes being separated from one another by a jump in time. The length of the time jump can hardly or not be estimated, so that in this respect, viewing a reproduction with a fast-motion factor of 5 is similar to viewing a reproduction with a fast-motion factor of 50.

It will be evident to an expert that the protective scope of the present invention as defined in the Claims is not limited to the examples shown in the drawings and disclosed in the text, but that it is possible to change or modify the disclosed embodiments of the method and the arrangement in accordance with the invention within the scope of the inventive concept.

The invention claimed is:

1. A method of reproducing information recorded on a record carrier, the information being a sequence of video frames coded in accordance with an MPEG format and including I frames, P frames and B frames, said method comprising the steps:
   moving the record carrier with respect to a read head at an adjustable speed;
   reading the information recorded on the record carrier with a speed which differs from a nominal playback speed, whereby said video frames of the sequence are supplied at a rate (number of frames per unit of time) differing from a nominal rate; and
   processing the information being read, and selectively supplying frames in the information being read to an output, wherein said processing step comprises the sub-steps:
   monitoring the frames in the information from the read head, and comparing a number of frames per unit of time in the read information with a predetermined nominal average;
   supplying the I frames of the read information to the output and, to ensure that the average number of frames supplied to the output per time unit is substantially equal to said predetermined nominal average, supplying at least one P frame of the read information to the output.

2. The method as claimed in claim 1, in which the record carrier is moved at a speed which is higher than a nominal playback speed, and in which, each time, a first predetermined number of consecutive frames is supplied to the output, after which a second predetermined number of consecutive frames are deleted, the second predetermined number being greater than the first predetermined number.

3. The method as claimed in claim 2, in which the first predetermined number of consecutive frames corresponds to an integral number of Groups of Pictures (GOPs), and in which the second predetermined number of consecutive frames corresponds to an integral number of GOPs.

4. The method as claimed in claim 1, wherein said processing step further comprises the sub-step:

supplying at least one B frame of the read information to the output to ensure that the average number of frames supplied to the output per time unit is substantially equal to said predetermined nominal average.

5. The method as claimed in claim 4, wherein said processing step further comprises the sub-step:

supplying at least one B frame of the read information to the output repetitively to ensure that the average number of frames supplied to the output per time unit is substantially equal to said predetermined nominal average.

* * * * *